Aug. 21, 1962 R. J. ROCKWELL 3,050,697
A.M. BRIDGE MODULATOR
Filed April 15, 1960
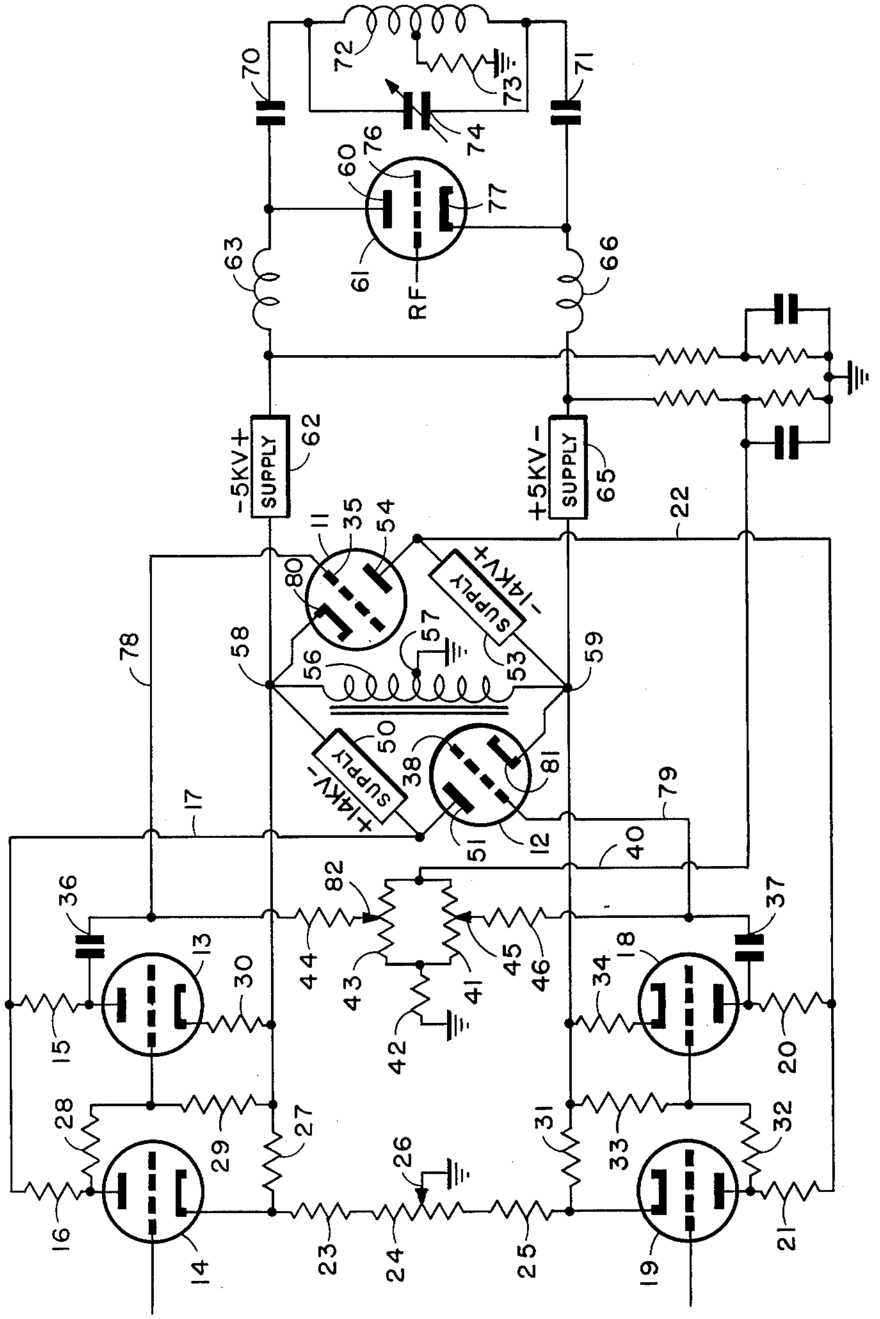
INVENTOR.
RONALD J. ROCKWELL.
BY Alden D. Redfield
Charles M. Hogan
ATTORNEYS.

United States Patent Office 3,050,697

Patented Aug. 21, 1962

3,050,697

A.M. BRIDGE MODULATOR

Ronald J. Rockwell, Cincinnati, Ohio, assignor to Crosley Broadcasting Corporation, Cincinnati, Ohio, a corporation of Ohio Filed Apr. 15, 1960, Ser. No. 22,457
11 Claims. (Cl. 332—47)

This invention relates to radio frequency transmitters, and more specifically to modulation circuits for use in a radio frequency transmitter.

In my United States Patent 2,875,413 there is provided a high level modulating system which eliminates the conventional modulation transformer, minimizes carrier shift, and transmits a very high fidelity signal. The present invention is an improvement over the patented invention.

It is an object of the present invention to provide a high level modulation system which dispenses with the anode reactor and coupling condensers between the modulator and output stages of the circuit illustrated in my United States Patent 2,875,413.

Another object of the present invention is to provide a modulation system comprising a novel combination in which a cathanode output bridge amplifier, in accordance with my United States Patent 2,817,718, is used to modulate both anode and cathode of a radio frequency stage of the type illustrated in my United States Patent 2,875,413.

In accordance with the invention there is provided, in signal transmitting, the combination of a modulated radio frequency stage including an output tube 61 having at least an anode 60, a cathode 77 and a control electrode 76, and means for applying modulating voltages both to said anode and to said cathode comprising: A source of push-pull audio signals (tubes 13, 14, 18, 19, etc.); and a bridge amplifier stage between said source and the modulated electrodes of said radio frequency stage, said bridge amplifier comprising: first and second modulator tubes 11 and 12 having respectively first and second cathodes 80 and 81, first and second control electrodes 35 and 38 and first and second anodes 54 and 51, first and second power supplies 53 and 50 arranged in a bridge configuration with the anode-cathode circuits of said first and second modulator tubes, said bridge network having one arm formed by the first modulator tube 11 and the first power supply 53 and another arm formed by the second modulator tube 12 and the second power supply 50, means 36, 78 and 37, 79 for coupling said source to the control electrodes of said first and second modulator tubes, an impedance 56 connected across both of said arms and between the junction of the negative terminal of the second power supply 50 and the cathode of the first modulator tube 11 and the junction of the negative terminal of the first power supply 53 and the cathode of the second modulator tube 12, said impedance having a center tap 57 connected to a point of reference potential, a third power supply 62 connected in series between the first-mentioned junction 58 and the anode 60 of said output tube, and a fourth power supply 65 connected in series between the other junction 59 and the cathode 77 of said output tube, the third power supply 62 being poled to render the anode of said output tube positive relative to said point of reference potential, and the fourth power supply 65 being poled to render the cathode of said output tube negative relative to said point.

For a better understanding of the present invention, together with other objects, advantages and capabilities thereof, reference is made to the following description of the appended drawing, the single FIGURE of which is a circuit schematic of a high level modulator in accordance with the invention.

In the single FIGURE disclosing the preferred embodiment of my invention, I show a two-tube modulator-amplifier stage including tubes 11 and 12. Modulator tube 11 is driven by a tube 13, in turn driven by a tube 14, these tubes being provided with anode resistors 15 and 16, respectively, each connected with conductor 17. In like fashion, modulator tube 12 is driven by a tube 18, in turn driven by a tube 19, these tubes being provided with anode resistors 20 and 21, respectively, each connected with conductor 22. Between the cathodes of driver tubes 14 and 19, are serially connected resistors 23, 24 and 25, resistor 24 being adjustably but symmetrically tapped by a grounded contact 26. The output of tube 14 is coupled to tube 13 and the cathode circuit of tube 13 is completed by a suitable network comprising resistors 27, 28, 29 and 30. Similarly, the output of tube 19 is coupled to the input of tube 18 and the cathode circuit of tube 18 is completed by a network comprising resistors 31, 32, 33 and 34. The anode of tube 13 is coupled to control electrode 35 of modulator tube 11 by coupling capacitor 36 and conductor 78. Coupling capacitor 37 and conductor 79 similarly couple the anode of tube 18 to the control electrode 38 of modulator tube 12. D.C. grid bias for tubes 11 and 12 is provided by a network between conductor 40 and ground, this network including a parallel pair of resistors 41 and 43, in series with a resistor 42. This network functions effectively as a pair of potentiometers, resistor 43 being adjustably tapped at 82 and the tap 82 being connected through resistor 44 and conductor 78 to grid 35 of tube 11. Similarly resistor 41 is adjustably tapped at 45 and tap 45 is connected through resistor 46 and conductor 79 to control electrode 38 of tube 12.

It will be understood that the control electrode-cathode input circuits of tubes 14 and 19 are suitably coupled to push-pull drivers (not shown) and all circuitry in front of the coupling condensers 36, 37 is defined in the claims as a source of push-pull audio signals in that it is the function of such circuitry to provide push-pull output audio frequency signals on conductors 78, 79 and to apply such signals to the control electrodes of the modulator tubes 11 and 12. Interposeed between this source of push-pull audio frequency signals and the modulated radio frequency output stage comprising tube 61 is a bridge-type modulator network which has many points of similarity to the bridge amplifier shown in my United States Patent 2,817,718. This bridge amplifier comprises first and second modulator tubes 11 and 12 and first and second power supplies 53 and 50 arranged in a bridge configuration. That is to say, the anode-cathode circuits of the modulator tubes are included in the arms of the bridge. One arm, between junctions 58 and 59, comprises modulator tube 11 and power supply 53. Cathode 80 of tube 11 is connected to junction 58 and anode 54 of that tube is connected to the positive terminal of power supply 53, the negative terminal of that power supply being connected to junction point 59. The second arm of the bridge network, also between junction 58 and 59, comprises the anode-cathode circuit of tube 12 and power supply 50. The cathode 81 of tube 12 is connected to junction point 59, and the positive terminal of power supply 50 is connected to anode 51 of tube 12. The negative terminal of power supply 50 is connected to junction 58. An iron core reactor 56, formed with a center tap 57 connected to ground as a point of reference potential, is conected across both arms of the bridge and between junctions 58 and 59, that is, between cathodes 80 and 81.

It will be observed that the first and second power supplies 53 and 50 and the cathode-anode circuits of the modulator tubes 11 and 12 are in a closed loop circuit.

It will also be observed that the anodes of tubes 13 and 14 are provided with positive voltage from power supply 50, the positive terminal of which is connected to conductor 17. The anodes of tubes 18 and 19 are provided with positive voltage by power supply 53, the positive terminal of which is connected to conductor 22. The cathode-anode circuit of tube 14, for example, may be traced through the following elements: 26, 23, tube 14, 16, 17, 50, 58, half of 56, 57, ground 26. Similarly, the cathode-anode path of tube 19 may be traced through the following elements: 26, 25, 19, 21, 22, 53, 59, half of 56, 57, 26. Thus it will be seen that power supply 50 supplies space current to tubes 12, 13 and 14, and power supply 53 supplies space current to tubes 11, 18 and 19.

The junctions 58 and 59, being the end terminals of the impedance 56, constitute the output terminals of the modulator. Terminal 58 is coupled to the anode 60 of the output stage tube 61 via a third and floating power supply 62 and a choke 63. Terminal 59 is coupled to the cathode 77 of the output stage via a fourth and floating power supply 65 and inductance 66. The elements 70, 71, 72, 73 and 74 correspond precisely in structure and function to the identically numbered elements of my U.S. Patent 2,875,413 and need not be described further herein. Power supply 62 is poled with its positive terminal adjacent inductor 63. Power supply 65 is poled with its negative terminal adjacent inductor 66.

The blocks 50, 53, 62, and 65 in the drawing designate power supplies. For brevity the legend "Supply" is placed in each block.

The radio frequency filter chokes 63 and 66 correspond to the elements 44 and 49, respectively, in my U.S. Patent 2,875,413.

The radio frequency carrier is supplied to control electrode 76 of the radio frequency output stage 61 from a source of oscillation, not shown, and this electrode is biased preferably for class C operation in a manner which per se is well understood by those skilled in the art and need not be described in further detail herein.

Push-pull audio signals are applied to the control electrodes of tubes 11 and 12 to control the current in impedance 56 and impedance 56 is coupled to the anode-cathode circuit of output tube 61 to modulate the carrier currents of the latter. Let it be assumed that the audio signal on conductor 78 is on its positive cycle, so that tube 11 is conducting and tube 12 not conducting. Under that condition, junction 58 goes positive by reason of electron flow from the negative terminal of rectifier 53 through the elements 56, 80 and 54 back to the positive terminal of rectifier 53. Junction 59 accordingly goes negative.

Now, on the other half cycle, when the audio signal on conductor 79 is on its positive cycle, modulator tube 12 is conducting and modulator tube 11 is not conducting so that the current flow through impedance 56 is in the opposite direction, whereby junction 59 goes positive and junction 58 goes negative. As the audio signals cause voltage variations at junctions 58 and 59, those variations are applied to the anode and cathode of tube 61 to modulate the carrier signals also applied to that tube. It will be seen, therefore, that reactor 56 is a modulating impedance, that the elements 11 and 53 are essentially an electronic rheostat which when tube 11 is conductive makes terminal 58 of this impedance positive and terminal 59 negative, and that the elements 12 and 50 constitute an oppositely poled electronic rheostat which, when tube 12 is conductive, renders terminal 59 of the impedance positive and terminal 58 negative. Thus it will be seen that the invention comprises a modulated stage and a modulator stage including a modulating impedance 56 coupled to the modulated stage and a pair of electronic rheostats 11, 53 and 12, 50 connected with opposite polarity to said modulating impedance to apply audio signals thereto. Each of the electronic rheostats includes a control electrode and these electrodes have audio signals applied thereto so that the source of audio signals functions in a manner analogous to the function which would be performed by a manual operator adjusting rheostats in equal and opposite fashion at an audio rate.

While there has been shown and described what is at present considered to be the preferred embodiment of the invention, it will be understood by those skilled in the art that various changes and modifications may be made therein without departing from the proper scope of the invention as defined in the appended claims.

Having described my invention, I claim:

1. In signal transmitting, the combination of a modulated radio frequency stage including an output tube having at least an anode, a cathode and a control electrode, and means for applying modulating voltages both to said anode and to said cathode comprising: A source of push-pull audio signals; and a bridge amplifier stage between said source and the modulated electrodes of said radio frequency stage, said bridge amplifier comprising: first and second modulator tubes having respectively first and second cathodes, first and second control electrodes and first and second anodes, first and second power supplies arranged in a bridge configuration with the anode-cathode circuits of said first and second modulator tubes, said bridge network having one arm formed by the first modulator tube and the first power supply and another arm formed by the second modulator tube and the second power supply, means for coupling said source to the control electrodes of said first and second modulator tubes, an impedance connected across and in parallel with both of said arms and between the junction of the negative terminal of the second power supply and the cathode of the first modulator tube and the junction of the negative terminal of the first power supply and the cathode of the second modulator tube, said impedance having a center tap connected to a point of reference potential, a third power supply connected in series between the first-mentioned junction and the anode of said output tube, and a fourth power supply connected in series between the other junction and the cathode of said output tube, the third power supply being poled to render the anode of said output tube positive relative to said point of reference potential, and the fourth power supply being poled to render the cathode of said output tube negative relative to said point.

2. In signal transmitting, the combination of a modulated radio frequency stage including an output tube having at least an anode, a cathode and a control electrode, and means for applying modulating voltages both to said anode and to said cathode comprising: A source of push-pull audio signals; and a bridge amplifier stage between said source and the modulated electrodes of said radio frequency stage, said bridge amplifier comprising: first and second modulator tubes having respectively first and second cathodes, first and second control electrodes and first and second anodes, first and second power supplies arranged in a bridge configuration with the anode-cathode circuits of said first and second modulator tubes, said bridge network having one arm formed by the first modulator tube and the first power supply and another arm formed by the second modulator tube and the second power supply, means for coupling said source to the control electrodes of said first and second modulator tubes, an impedance connected across and in parallel with both of said arms and between the junction of the negative terminal of the second power supply and the cathode of the first modulator tube and the junction of the negative terminal of the first power supply and the cathode of the second modulator tube, said impedance having a center tap connected to a point of reference potential, means for coupling said impedance to the anode and cathode of said output tube, and means for supplying space current for said output tube.

3. The combination of a modulated output stage, a modulating impedance coupled to said stage, a first electronic rheostat connected across and in parallel with said impedance, a second electronic rheostat connected across and in parallel with said impedance, the polarities of said rheostats being opposite, each of said electronic rheostats comprising a power supply and a vacuum tube having a cathode-anode circuit in series with its associated power supply, said rheostats being connected in a closed loop, the vacuum tubes in the electronic rheostats also having control electrodes, and a source of push-pull audio signals coupled to said control electrodes to apply phase-opposed voltages to said control electrodes.

4. The combination in accordance with claim 3 in which the modulated output stage comprises an output tube having an anode and a cathode, said anode being coupled to the cathode of the tube in one of the electronic rheostats, and the cathode of said output tube being coupled to the cathode of the tube in the other electronic rheostat.

5. The combination in accordance with claim 3 and means for biasing the vacuum tubes in the electronic rheostats for class B operation.

6. The combination in accordance with claim 5 and means for biasing the output stage for class C operation.

7. In signal transmitting, the combination of a modulated radio frequency stage including an output tube having at least an anode, a cathode and a control electrode, means for applying modulating voltages both to said anode and to said cathode comprising: A source of push-pull audio signals; and a bridge amplifier stage between said source and the modulated electrodes of said radio frequency stage, said bridge amplifier comprising: first and second modulator tubes having respectively first and second cathodes, first and second control electrodes and first and second anodes, first and second power supplies arranged in a bridge configuration with the anode-cathode circuits of said first and second modulator tubes, said bridge network having one arm formed by the first modulator tube and the first power supply and another arm formed by the second modulator tube and the second power supply, means for coupling said source to the control electrodes of said first and second modulator tubes, an impedance connected across and in parallel with both of said arms and between the junction of the negative terminal of the second power supply and the cathode of the first modulator tube and the junction of the negative terminal of the first power supply and the cathode of the second modulator tube, said impedance having a center tap connected to a point of reference potential, a third power supply connected in series between the first-mentioned junction and the anode of said output tube, and a fourth power supply connected in series betwen the other junction and the cathode of said output tube, the third power supply being poled to render the anode of said output tube positive relative to said point of reference potential, and the fourth power supply being poled to render the cathode of said output tube negative relative to said point; first and second cascaded driver tubes each having an anode and a control electrode; third and fourth cascaded driver tubes each having an anode and a cathode, all of said driver tubes being included in the source of push-pull signals, and means for coupling the outputs of the second and fourth driver tubes to the control electrodes of the first and second modulator tubes, respectively.

8. In signal transmitting, the combination in accordance with claim 7 and means for applying carrier frequency oscillations to the control electrode of said modulated stage.

9. In signal transmitting, the combination in accordance with claim 7 in which the impedance is an iron core reactor.

10. In signal transmitting, the combination in accordance with claim 7, cathode resistance in series with the anode-cathode circuits of all of the driver tubes, and an adjustable contact between said resistance and said point of reference potential.

11. In signal transmitting, the combination in accordance with claim 7, means for connecting the positive terminal of the second power supply to the anodes of the first and second driver tubes, and means for connecting the positive terminal of the first power supply to the anodes of the third and fourth driver tubes.

References Cited in the file of this patent

UNITED STATES PATENTS

| | | |
|---|---|---|
| 2,120,800 | Ditcham | June 14, 1938 |
| 2,711,512 | Rockwell | June 21, 1955 |
| 2,788,493 | Zawels | Apr. 9, 1957 |
| 2,794,077 | Olson | May 28, 1957 |